United States Patent
Daya et al.

(10) Patent No.: US 11,030,648 B1
(45) Date of Patent: Jun. 8, 2021

(54) SYSTEMS AND METHODS FOR PROVIDING DIVERSIFIED PROMOTIONAL MESSAGES

(71) Applicant: Groupon, Inc., Chicago, IL (US)

(72) Inventors: Rahim Daya, Chicago, IL (US); Michalis Potamias, San Francisco, CA (US)

(73) Assignee: Groupon, Inc., Chicago, IL (US)

( * ) Notice: Subject to any disclaimer, the term of this patent is extended or adjusted under 35 U.S.C. 154(b) by 825 days.

(21) Appl. No.: 14/473,933

(22) Filed: Aug. 29, 2014

Related U.S. Application Data

(60) Provisional application No. 61/872,574, filed on Aug. 30, 2013.

(51) Int. Cl.
*G06Q 30/02* (2012.01)

(52) U.S. Cl.
CPC .................. *G06Q 30/0254* (2013.01)

(58) Field of Classification Search
CPC ....................................................... G06Q 30/02
See application file for complete search history.

(56) References Cited

U.S. PATENT DOCUMENTS

| | | | | |
|---|---|---|---|---|
| 7,058,590 B2* | 6/2006 | Shan | ...................... | G06Q 30/02 705/7.29 |
| 2001/0034763 A1* | 10/2001 | Jacobs | ................. | G06Q 10/107 709/204 |
| 2004/0003398 A1* | 1/2004 | Donian | ................... | G06F 21/10 725/34 |
| 2004/0122735 A1* | 6/2004 | Meshkin | ................ | G06Q 30/02 705/14.27 |
| 2006/0026064 A1* | 2/2006 | Collins | .................. | G06Q 10/00 705/14.42 |
| 2007/0143296 A1* | 6/2007 | Casion | ................... | G06Q 30/02 |
| 2007/0198339 A1* | 8/2007 | Shen | ....................... | G06Q 30/02 705/14.64 |
| 2008/0249875 A1* | 10/2008 | Lee | .................... | G06F 17/30867 705/14.52 |
| 2008/0288328 A1* | 11/2008 | Minor | ................ | G06Q 10/0639 705/14.42 |
| 2009/0319648 A1* | 12/2009 | Dutta | ..................... | G06Q 30/02 709/221 |
| 2013/0073388 A1* | 3/2013 | Heath | .................... | G06Q 30/02 705/14.53 |
| 2017/0053305 A1* | 2/2017 | Montero | ................ | G06Q 30/02 |

* cited by examiner

*Primary Examiner* — Vincent M Cao
(74) *Attorney, Agent, or Firm* — Alston & Bird LLP

(57) ABSTRACT

Systems, apparatus, and methods for providing diversified promotions are discussed herein. Some embodiments may include a system including circuitry configured to provide diversified promotions within an impression or other communication including multiple promotions. For example, promotions may be associated with diversity characteristics to determine the diversity of promotional offerings within an impression and/or within a series of impressions over a period of time sent to a targeted consumer. When an impression is determined to lack diversity based on the diversity characteristics of the promotions, the system may be configured to take corrective action such as by replacing at least one promotion with a replacement promotion that provides greater diversity to the impression.

18 Claims, 7 Drawing Sheets

SYSTEMS AND METHODS FOR PROVIDING DIVERSIFIED PROMOTIONAL MESSAGES

CROSS REFERENCE TO RELATED APPLICATIONS

This application claims the benefit of U.S. Provisional Application No. 61/872,574, titled "Systems and Methods for Providing Diversified Promotional Messages," filed Aug. 30, 2013, which is incorporated by reference herein in its entirety.

FIELD

Embodiments of the invention relate, generally, to techniques for providing promotions to consumers.

BACKGROUND

Via electronic networks (e.g., the Internet), promotional systems provide promotions associated with merchants to consumer devices. Oftentimes, a promotional system may provide multiple promotions to consumers (e.g., within a single communication or over a period of time) that are of different merchants and/or for different products, services, or experiences. In this regard, areas for improving current systems have been identified.

BRIEF SUMMARY

Through applied effort, ingenuity, and innovation, solutions to improve such systems have been realized and are described herein. Some embodiments may provide for a system configured to provide impressions including programmatically diversified promotions to consumer devices consumers. The system may include a promotion database and one or more servers. The one or more servers may include communication circuitry configured to form a connection with the consumer devices via a network. The processing circuitry may be configured to: access promotion data from the promotion database indicating promotion data records that are available and one or more diversity characteristics for each promotion data record, wherein the one or more diversity characteristics include a first diversity characteristic; generate an impression targeted to a consumer account indicating a plurality of promotion data records, wherein the plurality of promotion data records is selected from the available promotion data records based at least in part on a relevance ranking of the available promotion data records with respect to the consumer account; determine, based on the promotion data, whether the first diversity characteristic of a first promotion data record has the same value as the first diversity characteristic of a second promotion data record, wherein the first promotion data record and the second promotion data record are part of the plurality of promotion data records; in response to determining that the first diversity characteristic of the first promotion data record has the same value as the first diversity characteristic of the second promotion data record, update the impression by replacing the first promotion data record with a third promotion data record associated with a different value for the first diversity characteristic than the first promotion data record; and provide the impression to a consumer device associated with the consumer account via the network. For example, the first diversity characteristic may include one of a promotion category and a merchant.

In some embodiments, the system may further include a consumer database. The processing circuitry of the one or more servers may be further configured to: access, from the consumer database, historical consumer data indicating one or more diversity characteristic values associated with promotion data records that have been provided to the consumer account within a predetermined time; determine whether the first promotion data record of the plurality of promotion data records includes a diversity characteristic that has the same value as at least one of the one or more diversity characteristic values; and in response to determining that the first promotion data record includes a diversity characteristic that has the same value as the at least one of the one or more diversity characteristics, update the impression by replacing the first promotion data record with a fourth promotion data record associated with a different value for the diversity characteristic than the first promotion. For example, the diversity characteristic may include one of a promotion category and a merchant.

In some embodiments, the processing circuitry of the one or more servers may be further configured to: determine an availability period for the third promotion data record based on the promotion data; determine whether the availability period has lapsed; and in response to determining that the availability period has failed to lapse; update the impression by replacing the first promotion data record with the third promotion data record.

In some embodiments, processing circuitry of the one or more servers may be further configured to: determine a promotion count for the impression indicating a number of promotion data records that the impression is configured to indicate; determine whether the plurality of promotion data records of the impression is less than the promotion count; and in response to determining that the plurality of promotion data records is less than the promotion count, update the impression by adding an additional promotion data record to the impression. In some embodiments, the processing circuitry configured to generate the impression indicating the plurality promotion data records includes the processing circuitry being configured to generate the impression indicating the plurality of promotion data records that are each associated with a feature period that has failed to lapse. Furthermore, the additional promotion data record may be associated with a feature period that has lapsed. In some embodiments, the additional promotion data record may be associated with a different first diversity characteristic value than the first diversity characteristic of each of the plurality of promotion data records.

In some embodiments, the additional promotion data record may be associated with a different first diversity characteristic value than first diversity characteristics values associated with promotion data records that have been provided to the consumer device within a predetermined period of time. The processing circuitry of the one or more servers may be further configured to: track promotion data records provided to the consumer device; generate historical consumer data indicating the promotion data records provided to the consumer device; store the historical consumer data in a consumer database.

Some embodiments may provide for a machine-implemented method for providing impressions including programmatically diversified promotions to consumer devices. The method may include: accessing, by circuitry connected with the consumer devices via a network, promotion data from a promotion database indicating promotion data records that are available and one or more diversity characteristics for each promotion data record, wherein the one or more diversity characteristics include a first diversity characteristic; generating, by the circuitry, an impression targeted to a consumer account indicating a plurality of promotion data records, wherein the plurality of promotion data records is selected from the available promotion data records based at least in part on a relevance ranking of the available promotion data records with respect to the consumer account; determining, based on the promotion data and by the circuitry, whether the first diversity characteristic of a first promotion data record has the same value as the first diversity characteristic of a second promotion data record, wherein the first promotion and the second promotion are part of the plurality of promotion data records; in response to determining that the first diversity characteristic of the first promotion data record has the same value as the first diversity characteristic of the second promotion data record, updating, by the circuitry, the impression by replacing the first promotion data record with a third promotion data record associated with a different value for the first diversity characteristic than the first promotion data record; and providing, by the circuitry, the impression to a consumer device associated with the consumer account via the network. For example, the first diversity characteristic may include one of a promotion category and a merchant.

In some embodiments, the method may further include, by the circuitry: accessing, from a consumer database, historical consumer data indicating one or more diversity characteristic values associated with promotion data records that have been provided to the consumer account within a predetermined time; determining whether the first promotion data record of the plurality of promotion data records includes a diversity characteristic that has the same value as at least one of the one or more diversity characteristic values; and in response to determining that the first promotion data record includes a diversity characteristic that has the same value as the at least one of the one or more diversity characteristics values, updating the impression by replacing the first promotion data record with a fourth promotion data record associated with a different value for the diversity characteristic than the first promotion data record. For example, the diversity characteristic may include one of a promotion category and a merchant.

In some embodiments, the method may further include, by the circuitry: determining an availability period for the third promotion data record based on the promotion data; determining whether the availability period has lapsed; and in response to determining that the availability period has failed to lapse; updating the impression by replacing the first promotion data record with the third promotion data record.

In some embodiments, the method may further include, by the circuitry: determining a promotion count for the impression indicating a number of promotion data records that the impression is configured to indicate; determining whether the plurality of promotion data records of the impression is less than the promotion count; and in response to determining that the plurality of promotion data records is less than the promotion count, updating the impression by adding an additional promotion data record to the impression. In some embodiments, generating the impression indicating the plurality of promotion data records may include generating the impression indicating the plurality of promotion data records that are each associated with feature period that has failed to lapse. Furthermore, the additional promotion data record may be associated with a feature period that has lapsed. In some embodiments, the additional promotion data record may be associated with a different first diversity characteristic value than the first diversity characteristic of each of the plurality of promotion data records. In some embodiments, additional promotion data record may be associated with a different first diversity characteristic value than first diversity characteristic values associated with promotion data records that have been provided to the consumer account within a predetermined period of time.

Some embodiments may provide for an apparatus configured to provide impressions including programmatically diversified promotions to consumer devices. The apparatus may include networked processing circuitry connected with the consumer devices. The networked processing circuitry may be configured to: access promotion data from a promotion database indicating promotion data records that are available and one or more diversity characteristics for each promotion data record, wherein the one or more diversity characteristics include a first diversity characteristic; generate an impression targeted to a consumer account indicating a plurality of promotion data records, wherein the plurality of promotion data records is selected from the available promotion data records based at least in part on a relevance ranking of the available promotion data records with respect to the consumer account; determine, based on the promotion data, whether the first diversity characteristic of a first promotion data record has the same value as the first diversity characteristic of a second promotion data record, wherein the first promotion data record and the second promotion data record are part of the plurality of promotion data records; in response to determining that the first diversity characteristic of the first promotion data record has the same value as the first diversity characteristic of the second promotion data record, update the impression by replacing the first promotion data record with a third promotion data record associated with a different value for the first diversity characteristic than the first promotion data record; access, from a consumer database, historical consumer data indicating one or more diversity characteristic values associated with promotion data records that have been provided to the consumer account within a predetermined time; determine whether a fourth promotion data record of the plurality of promotion data records includes a diversity characteristic that has the same value as at least one of the one or more diversity characteristic values; in response to determining that the fourth promotion data record includes a diversity characteristic that has the same value as the at least one of the one or more diversity characteristics, update the impression by replacing the fourth promotion data record with a fifth promotion data record associated with a different value for the diversity characteristic than the fourth promotion; and provide the impression to a consumer device associated with the consumer account via the network. In some embodiments, the first diversity characteristic may include one of a promotion category and a merchant.

Some embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

BRIEF DESCRIPTION OF THE DRAWINGS

Figure 1:
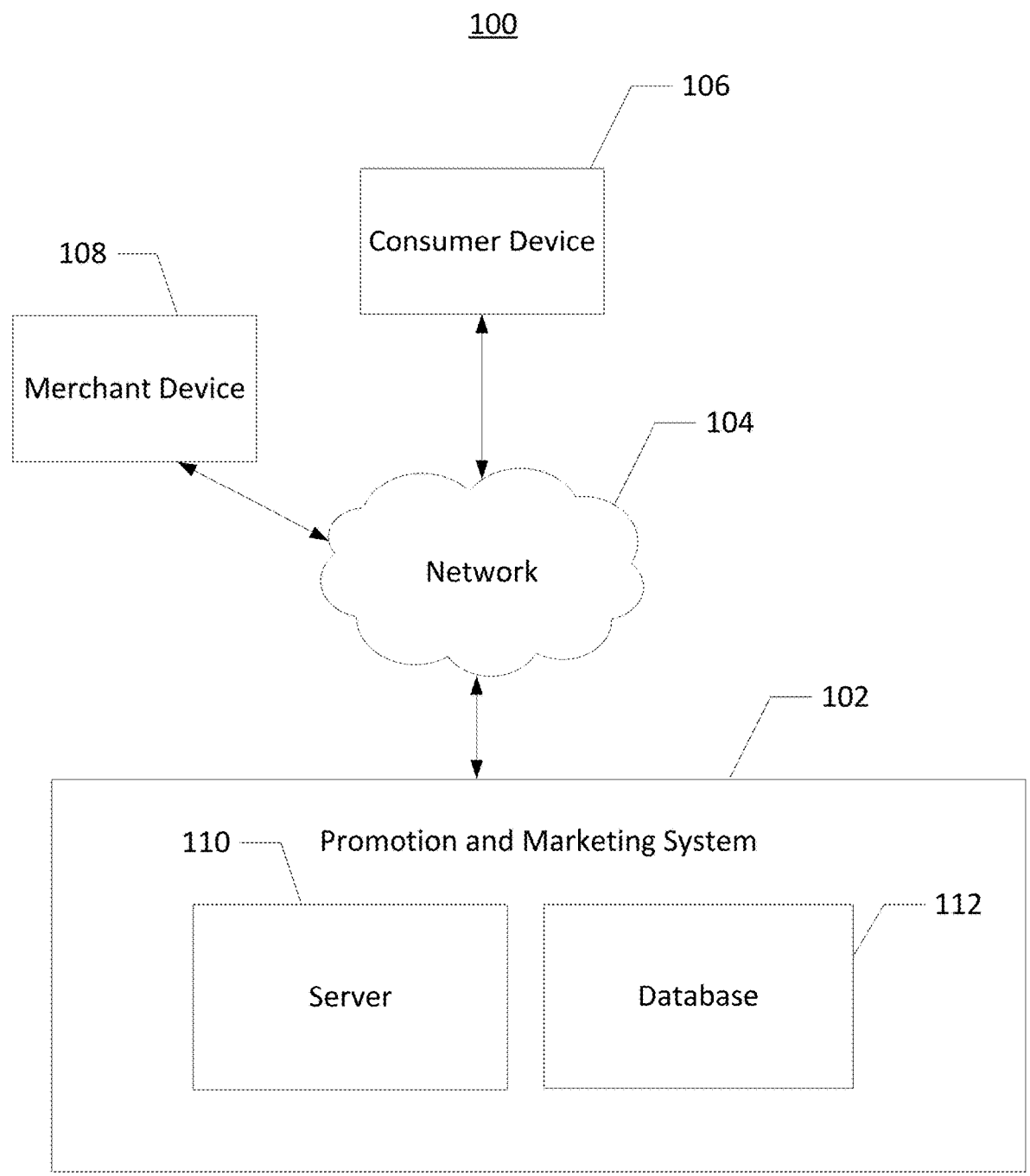
Figure 2:
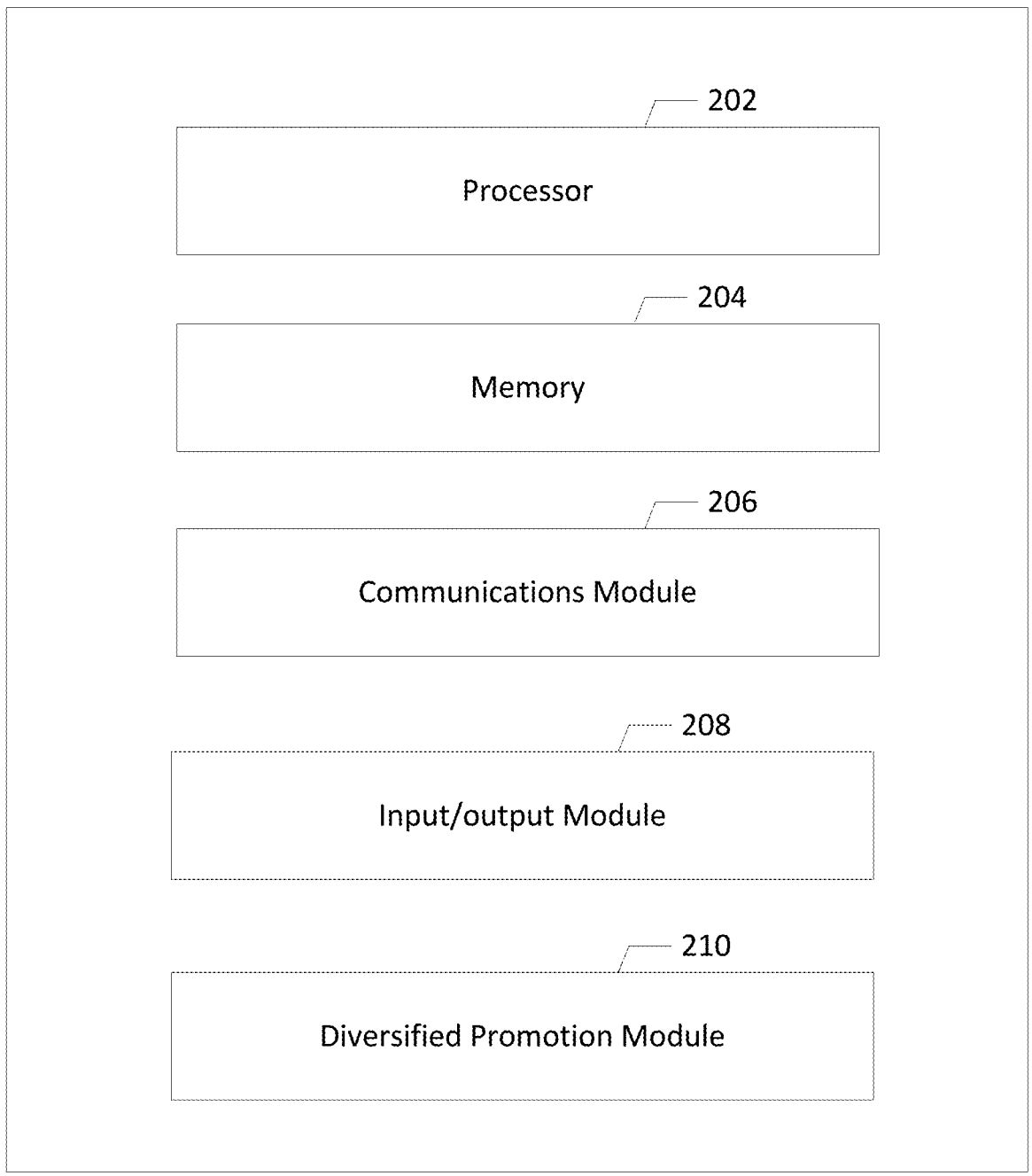
Figure 3:
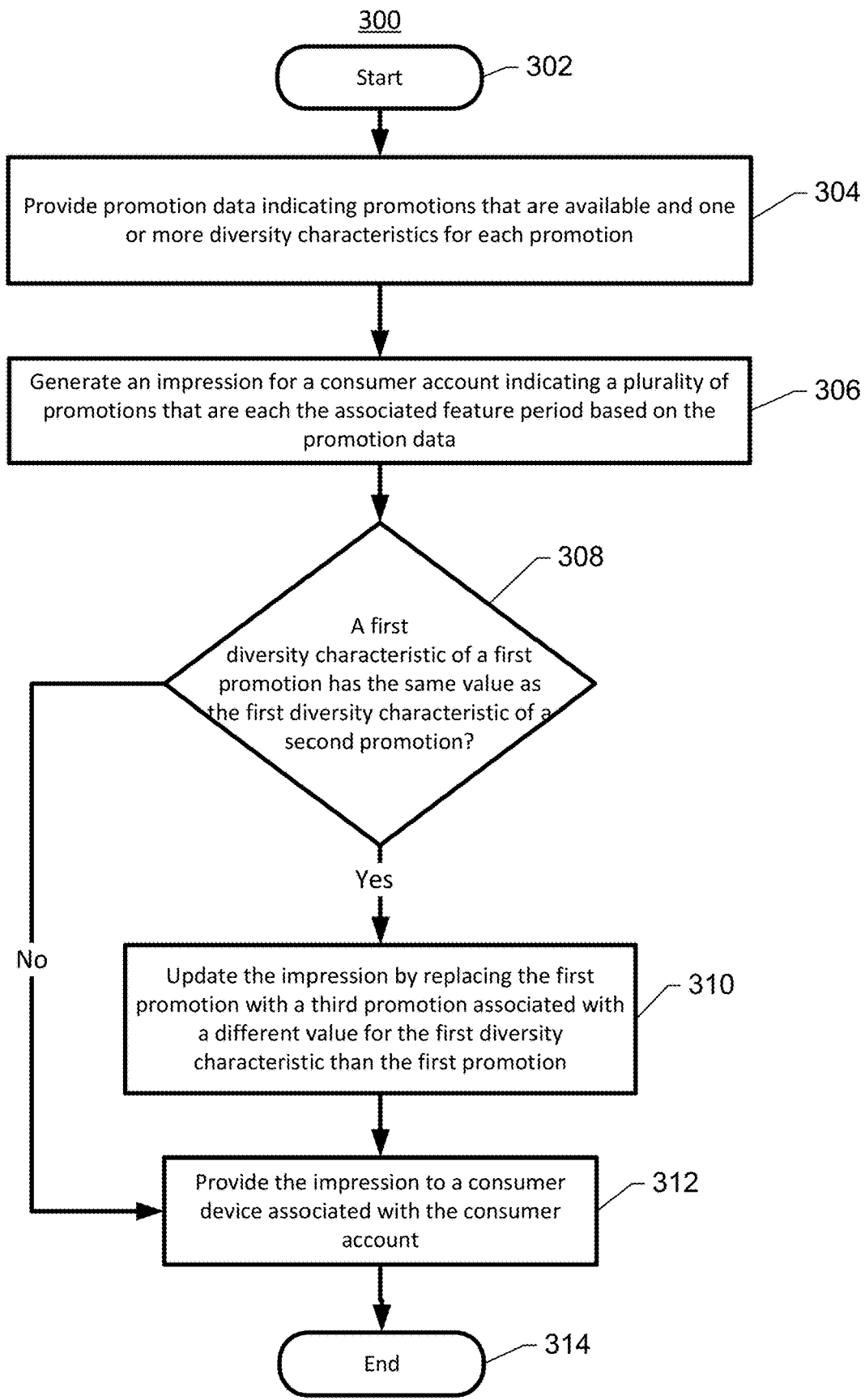
Figure 4:
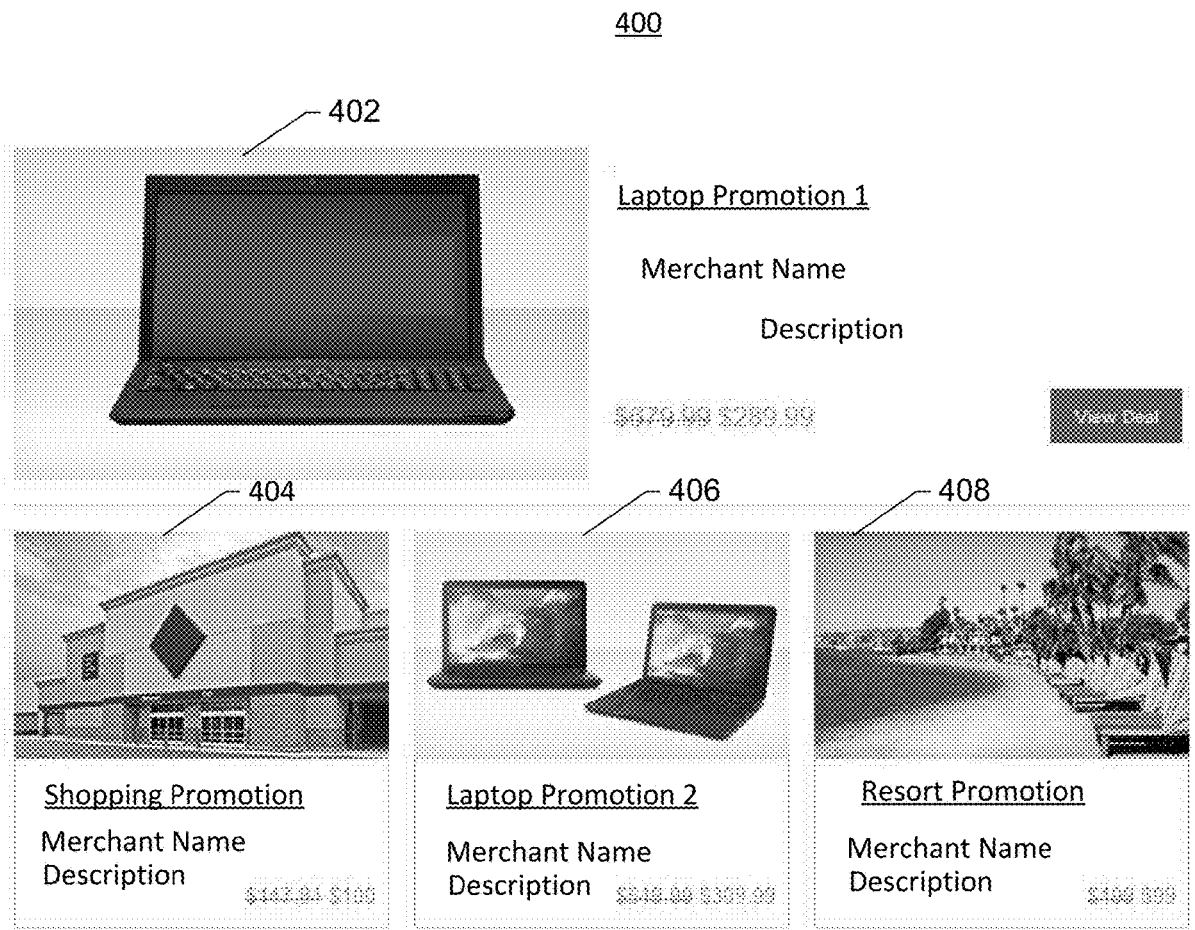
Figure 5:
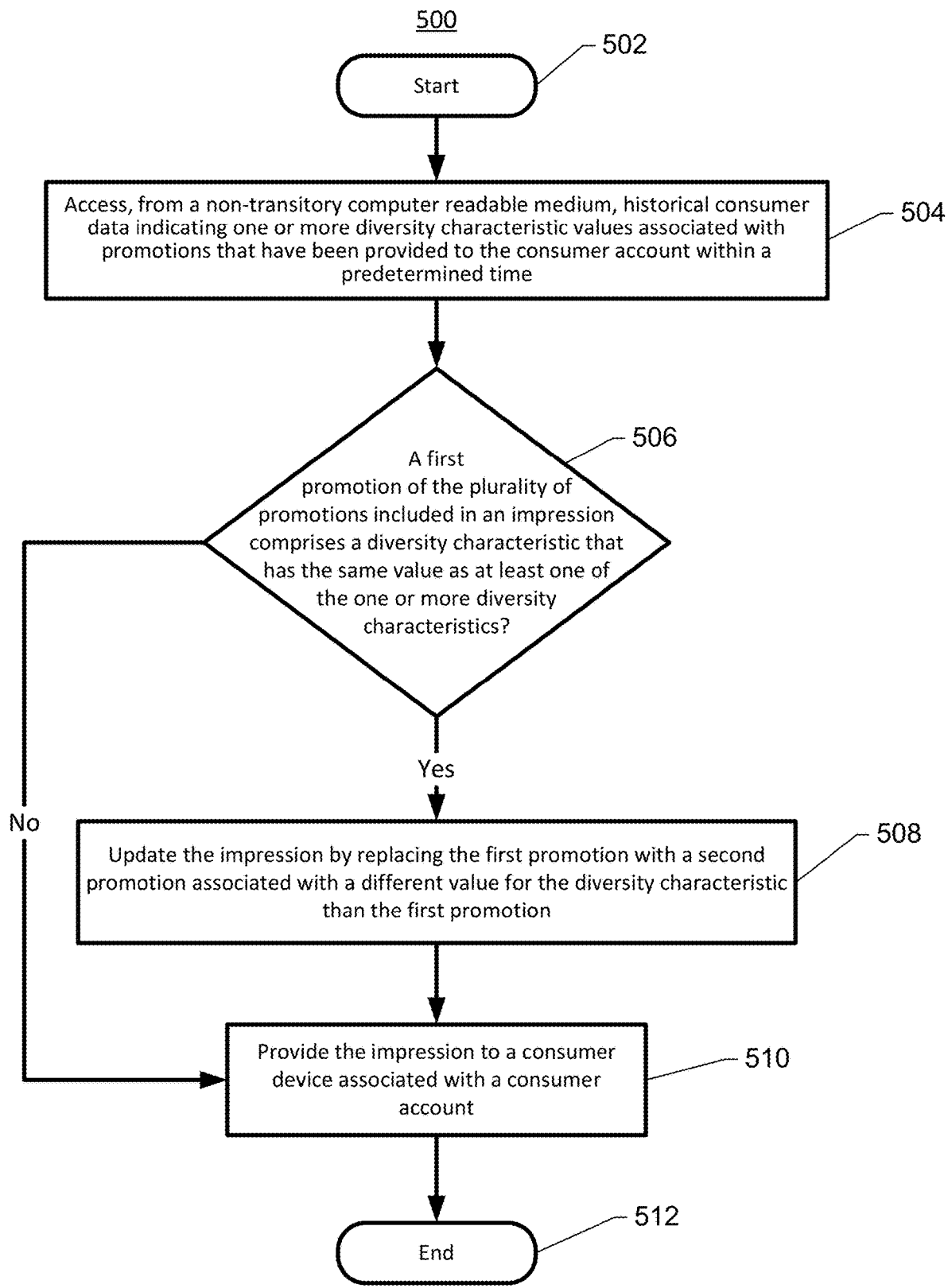
Figure 6:
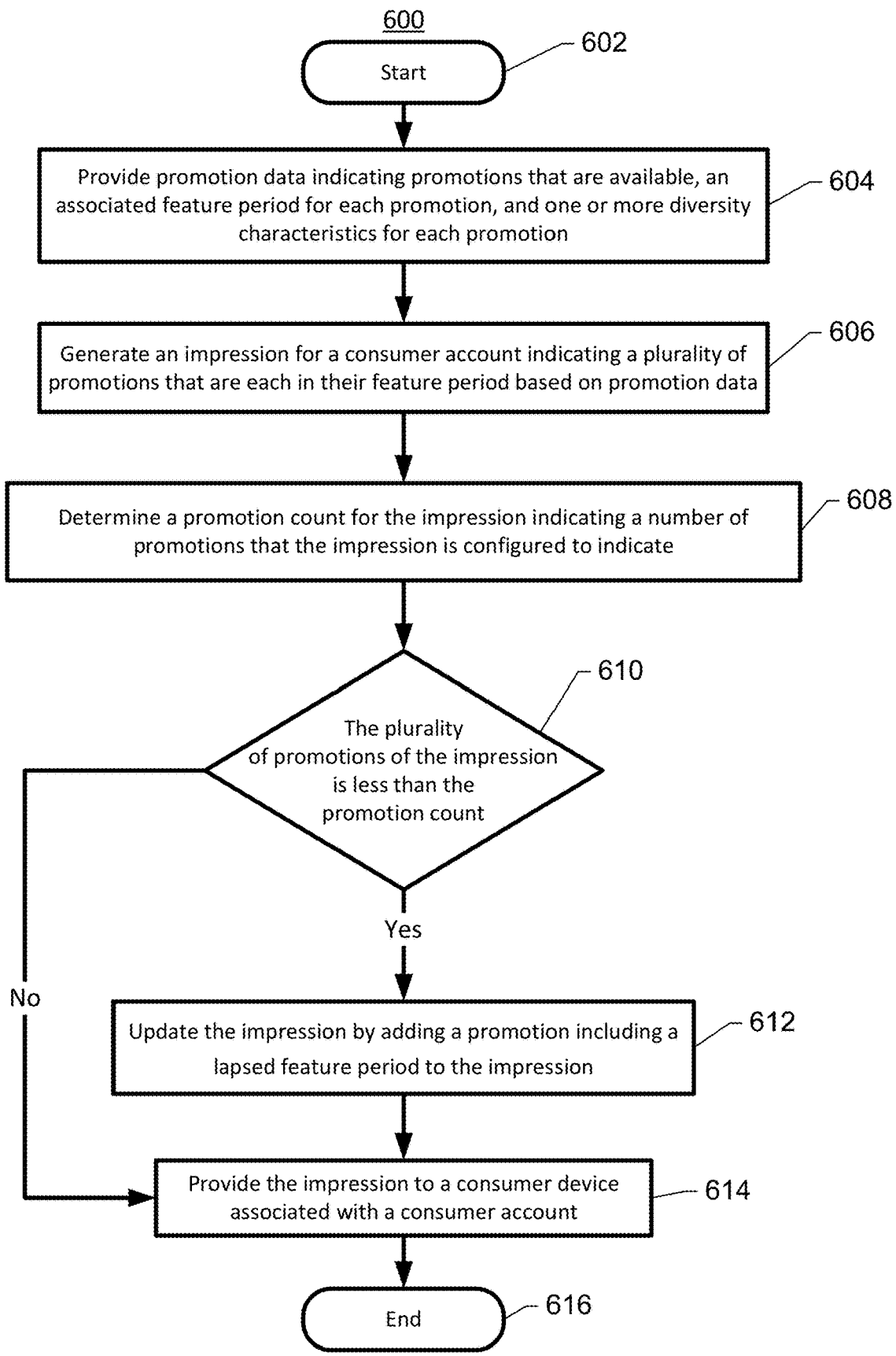
Figure 7:
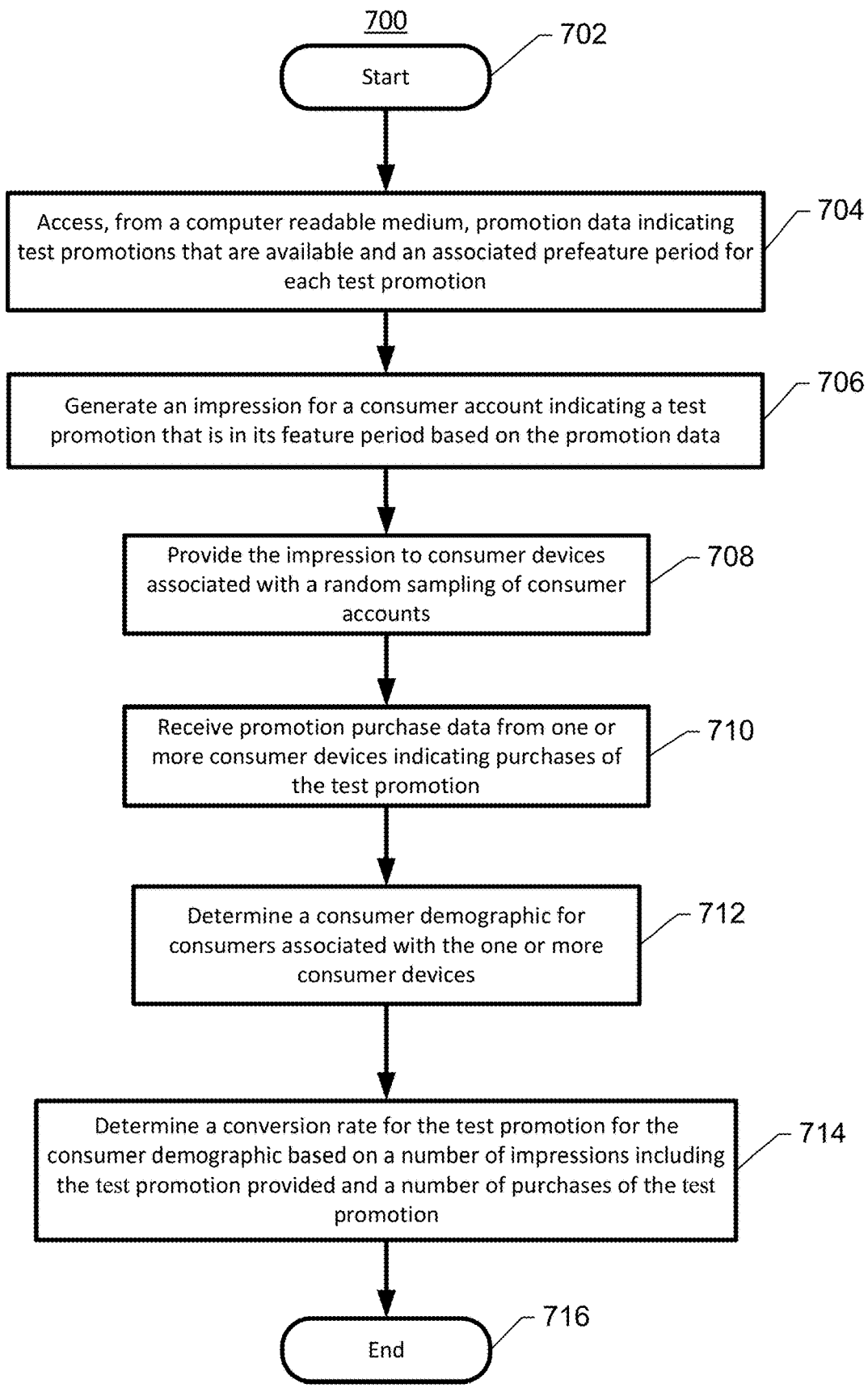

Having thus described some embodiments in general terms, reference will now be made to the accompanying drawings, which are not necessarily drawn to scale, and wherein:

FIG. 1 shows an example system in accordance with some embodiments;

FIG. 2 shows example circuitry in accordance with some embodiments;

FIG. 3 shows an example of a method for providing an impression including diversified promotions performed in accordance with some embodiments;

FIG. 4 shows an example impression in accordance with some embodiments;

FIG. 5 shows an example of a method for providing an impression including diversified promotions performed in accordance with some embodiments;

FIG. 6 shows an example of a method for providing promotion inventory shock management performed in accordance with some embodiments; and FIG. 7 shows an example of a method for providing a promotion performance test performed in accordance with some embodiments.

DETAILED DESCRIPTION

Glossary

As used herein, an "impression" includes a communication, a display, or other perceived indication, such as e-mail, text message, webpage, application alert, mobile applications, other type of electronic interface or distribution channel and/or the like, of one or more promotions. In that sense, an impression may provide an indication of one or more promotions.

A "promotion," as used herein, includes any type of offered, presented or otherwise indicated reward, discount, coupon, credit, deal, incentive, discount, media or the like that is indicative of a promotional value or the like that upon purchase or acceptance results in the issuance of an instrument (e.g., electronic or otherwise) that may be used toward at least a portion of the purchase of particular goods, services and/or experiences defined by the promotion.

As used herein, "promotion data," refers to data that defines a promotion and parameters of the promotion.

As used herein, a "promotion data record" refers to a promotion or promotion data that is stored as a record in a database, such as a promotion database configured to store a collection of promotion data records.

As used herein, a "diversity characteristic" refers to criteria by which diversity among a group promotion data records (e.g., selected for inclusion within an impression) may be determined. Some example diversity characteristics of a promotion may include the identity of the offering merchant of the promotion, the promotion category of the promotion, the price, or the redemption (e.g., merchant shop) location.

As used herein, a "diversity characteristic value" refers to a value of a diversity characteristic. For example, promotion data records of different offering merchants may have different diversity characteristic values for the merchant diversity characteristic. In another example, promotion data records of different categories of goods defined by the promotion may have different diversity characteristic values for the promotion category diversity characteristic, such as "Food and Drink," "Events and Activities, "Shopping," "Beauty and Spa," for a promotion category diversity characteristic.

As used herein, "historical consumer data" refers to data indicating one or more diversity characteristic values associated with promotion data records that have been provided to the consumer account via impressions. Historical consumer data may further indicate times at which impressions indicating the promotion data records were sent.

Embodiments will be described more fully hereinafter with reference to the accompanying drawings, in which some, but not all embodiments contemplated herein are shown. Indeed, various embodiments may be implemented in many different forms and should not be construed as limited to the embodiments set forth herein; rather, these embodiments are provided so that this disclosure will satisfy applicable legal requirements. Like numbers refer to like elements throughout.

Brief Overview

Methods, systems, apparatus and computer program products described herein may be operable to provide impressions to consumers including diversified promotions.

For example, in some embodiments, a system may be configured to generate an impression by accessing promotion data (e.g., from a database) indicating promotions that are available for offering to consumers. For example, the database may include promotion data defining the available promotions and associated promotion data, such as promotion data defining a feature period for each promotion. The feature period, for example, may include an end date and prior to lapse of the end date, a promotion may be given greater priority for being included in an impression as a "fresh" deal. The system may be further configured to generate an impression (e.g., for a consumer via a consumer account) indicating a plurality of promotions that are each in a respective feature period.

Some embodiments may further provide for techniques for updating, modifying or otherwise generating an impression to ensure that the impression includes diversified promotions. For example, in some embodiments, the system may be configured to check intra-impression diversity to ensure that promotion diversity for an impression including multiple promotions. Each promotion may be associated with one or more diversity characteristics by which diversity may be determined. Some example diversity characteristics of promotions may include merchant (e.g., the merchant that is offering or otherwise associated with the promotion) and/or promotion category (e.g., type of goods, services and/or experiences). Here, an impression including two or more promotions from the same merchant and/or promotion category may be determined to lack diversity and corrective action may be taken. For example, the system may be configured to replace a first promotion of the impression that has a same diversity characteristic value (e.g., same merchant and/or same promotion category) as a second promotion of the impression, such as with a third promotion that is associated with a different diversity characteristic value than the first promotion.

In some embodiments, other example diversity characteristics other than merchant and promotion category may alternatively and/or additionally be used, such as price (e.g., to provide greater diversity of promotion price ranges) and/or location (e.g., to provide greater diversity in neighborhood locations of a consumer's city). In that sense, while merchant and promotion category diversity characteristics are discussed in detail herein, similar techniques may be suitable to other diversity characteristics and/or combinations thereof.

Some embodiments may additionally or alternatively provide for techniques for updating, modifying or otherwise generating an impression to ensure that the impression includes inter-impression diversity, such as for a series of impressions sent over a predetermined period of time (e.g., daily, weekly, monthly, etc.). In some embodiments, the system may be configured to access historical consumer data indicating one or more diversity characteristic values associated with promotions that have been provided to a consumer account within a predetermined time. For example, an impression including a merchant and/or promotion category that has been previously sent to the same consumer within the predetermined period of time may be determined to lack diversity and corrective action may be taken. Here, the system may be configured to replace a promotion of the impression having a shared (inter-impression) diversity characteristic value, such as with another promotion (e.g., in a promotion bank or other promotion data database) that is associated with a different diversity characteristic value than the one or more diversity characteristic values associated with promotions that have been provided to a consumer account within the predetermined period of time.

In that sense, some embodiments may provide for offering "diversified" targeted advertising messages to consumers, where diversity can be defined by looking within a communication (e.g., an impression) and/or a series of communications with the consumer. For example, consumers may subscribe (e.g., by creating a consumer account with the system) to a service that provides for a series of impressions to consumer devices of the consumers, such as on a scheduled basis and/or in response to merchant and/or consumer requests. Historical consumer data indicating one or more diversity characteristics associated with promotions that have been provided to the consumer account and/or the promotions may be tracked for each impression sent and/or stored in a computer readable medium such as a database.

Based on receiving or otherwise accessing promotion data from a computer readable medium (e.g., a database, which may include the historical consumer data or may be separate therefrom) indicating the promotion parameters (e.g., feature date, availability date, etc.) and diversity characteristics of available promotions, the circuitry may be configured to provide diverse and targeted impressions of the available promotions, such as via the Internet, email, and/or SMS text, to a consumer device associated with the targeted consumer and/or consumer account.

As such, individual consumers can receive individually targeted messages that are diverse to the consumer relative to previously sent individually targeted messages, thereby alleviating the prohibitive costs of manually tracking and building diverse impressions, such as on a daily basis, for each consumer of a large scale commercial system.

Some embodiments may further provide for a promotion bank. The promotion bank may include promotion data defining promotions and may serve as a repository from which impressions may be generated. In some embodiments, such as when there are insufficient promotions in their feature period to generate a complete impression, the system may be configured to access the promotion bank to add a promotion (e.g., that is not in its feature period but is otherwise still available for offer) to the impression. In some embodiments, after the promotion data defining promotions are provided to the promotion bank, the system may be configured to programmatically generate and send impressions that are diverse and/or targeted to particular consumers by accessing the promotion bank. Some embodiments may further provide for techniques for promotion performance testing which may be leveraged to provide targeted and diverse promotions to consumers based on consumer demographics.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a device is described herein to receive data from another device, it will be appreciated that the data may be received directly from the another device or may be received indirectly via one or more intermediary devices, such as, for example, one or more servers, relays, routers, network access points, base stations, and/or the like, sometimes referred to herein as a "network." Similarly, where a device is described herein to send data to another device, it will be appreciated that the data may be sent directly to the another device or may be sent indirectly via one or more intermediary devices, such as, for example, one or more servers, relays, routers, network access points, base stations, and/or the like.

As used herein, the term "method" refers to one or more steps that may be performed by a device, apparatus, system, circuitry, one or more processors, or the like. Where an example method is shown as including more than one step, it will be appreciated that the steps may be performed in different orders than as shown in the example and that not all steps are necessarily required. Furthermore, the methods are described herein as being performed by example structures for clarity and are not limited to those structures (e.g., a particular server, device, apparatus, etc.) in some embodiments.

Exemplary System Architecture

FIG. 1 shows an example system 100 in accordance with some embodiments. System 100 may include promotion and marketing system 102 (or "system 102"), network 104, consumer device 106, and merchant device 108. System 102 may be communicably connected with consumer device 106 and merchant device 108 via network 104. System 102 may include server 110 and database 112.

Server 110 may include circuitry, networked processors, or the like configured to perform some or all of the server-based processes described herein and may be any suitable network server and/or other type of processing device. In some embodiments, system 102 may function as a "cloud" with respect to the consumer device 106 and/or merchant device 108. In that sense, server 110 may include several servers performing interconnected and/or distributed functions. To avoid unnecessarily overcomplicating the disclosure, server 110 is shown and described herein as a single server.

Database 112 may be any suitable network storage device configured to store some or all of the information described herein. For example, database 112 may be configured to store promotion data indicating promotions that are available and their parameters. In some embodiments, the promotion data may further include an associated feature period (e.g., indicating a time in which a promotion is featured, fresh, new, or otherwise prioritized), an availability period (e.g., indicating a time in which the promotion is available to be offered to consumers), and/or one or more diversity characteristics for each promotion (e.g., merchant, category, price, location, etc.). In some embodiments, database 112 may be further configured to store historical consumer data for tracking promotions and/or associated diversity characteristics that have been sent to a consumer, consumer account, and/or consumer device. Database 112 may be further configured to store consumer information including consumer account information, login information (e.g., identification and/or authentication data), consumer account history, etc. As such, database 112 may include, for example, one or more database systems, backend data servers, network databases, cloud storage devices, etc. To avoid unnecessarily overcomplicating the disclosure, database 112 is shown and described herein as a single database.

Network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (such as, e.g., network routers, switches, hubs, etc.). For example, network 104 may include a cellular telephone, mobile broadband, long term evolution (LTE), GSM/EDGE, UMTS/HSPA, IEEE 802.11, IEEE 802.16, IEEE 802.20, WiFi, dial-up, and/or WiMax network. Furthermore, network 104 may include a public network, such as the Internet, a private network, such as an intranet, or combinations thereof, and may utilize a variety of networking protocols now available or later developed including, but not limited to TCP/IP based networking protocols.

Consumer device 106 may be associated with a consumer and/or consumer account, such as a consumer with a consumer account provided by system 102. Although a single consumer device 106 is shown, system 100 may include any number of consumer devices that may be associated with various other consumers and/or consumer accounts. Consumer device 106 may be a mobile device and/or a stationary device. For example, consumer device 106 may be a mobile device such as a cellular telephone (including smartphones and/or other types of mobile telephones), laptop, tablet, electronic reader, e-book device, media device, and/or the like. Additionally and/or alternatively, consumer device 106 may be a stationary device such as a desktop computer, work station, point-of-sale device, or the like.

Merchant device 108 may be associated with a merchant and/or provider of promotions. Although a single merchant device 108 is shown, system 100 may include any number of merchant devices that may be associated with various other merchants. In some embodiments, merchant device 108 may be configured to provide point-of-sale (POS) functionality for the merchant, such as at the merchant's shop. Furthermore, merchant device 108 may be a stationary and/or mobile device. In some embodiments, system 102 may be configured to receive promotion data indicating a promotion for goods and/or services and/or one or more parameters of the promotion (e.g., target audience, timing, purchase value, promotional value, residual value, etc.). System 102 may then generate and/or provide one or more impressions including the promotion to consumer devices 102.

FIG. 2 shows a schematic block diagram of example circuitry 200, some or all of which may be included in system 102, server 110, database 112, user device 106, and/or merchant device 108. In accordance with some example embodiments, circuitry 200 may include various means, such as one or more processors 202, memories 204, communications modules 206, and/or input/output modules 208.

In some embodiments, such as when circuitry 200 is included in system 102, diversified promotion module 210 may also or instead be included with processor 202. As referred to herein, "module" includes hardware, software and/or firmware configured to perform one or more particular functions. In this regard, the means of circuitry 200 as described herein may be embodied as, for example, circuitry, hardware elements (e.g., a suitably programmed processor, combinational logic circuit, integrated circuit, and/or the like), a computer program product comprising computer-readable program instructions stored on a non-transitory computer-readable medium (e.g., memory 204) that is executable by a suitably configured processing device (e.g., processor 202), or some combination thereof.

Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, processor 202 may comprise a plurality of processing means. The plurality of processing means may be embodied on a single computing device or may be distributed across a plurality of computing devices collectively configured to function as circuitry 200. The plurality of processing means may be in operative communication with each other and may be collectively configured to perform one or more functionalities of circuitry 200 as described herein. In an example embodiment, processor 202 may be configured to execute instructions stored in memory 204 or otherwise accessible to processor 202. These instructions, when executed by processor 202, may cause circuitry 200 to perform one or more of the functionalities described herein.

Whether configured by hardware, firmware/software methods, or by a combination thereof, processor 202 may comprise an entity capable of performing operations according to embodiments of the present invention while configured accordingly. Thus, for example, when processor 202 is embodied as an ASIC, FPGA or the like, processor 202 may comprise specifically configured hardware for conducting one or more operations described herein. As another example, when processor 202 may be embodied as an executor of instructions, such as may be stored in memory 204, the instructions may specifically configure processor 202 to perform one or more algorithms, methods or operations described herein. For example, processor 202 may be configured to execute operating system applications, firmware applications, media playback applications, media editing applications, among other things.

Memory 204 may comprise, for example, volatile memory, non-volatile memory, or some combination thereof. Although illustrated in FIG. 2 as a single memory, memory 204 may comprise a plurality of memory components. The plurality of memory components may be embodied on a single computing component or distributed across a plurality of computing components. In various embodiments, memory 204 may comprise, for example, a hard disk, random access memory, cache memory, flash memory, a compact disc read only memory (CD-ROM), solid state memory, digital versatile disc read only memory (DVD-ROM), an optical disc, circuitry configured to store information, integrated circuitry, chemical/biological memory, paper, or some combination thereof. Memory 204 may be configured to store information, data, applications, instructions, or the like for enabling circuitry 200 to carry out various functions in accordance with example embodiments discussed herein. For example, in at least some embodiments, memory 204 may be configured to buffer input data for processing by processor 202. Additionally or alternatively, in at least some embodiments, memory 204 may be configured to store program instructions for execution by processor 202 and/or data for processing by processor 202. Memory 204 may store information in the form of static and/or dynamic information. This stored information may be stored and/or used by circuitry 200 during the course of performing its functionalities.

Communications module 206 may be embodied as any component or means embodied in circuitry, hardware, a computer program product comprising computer readable program instructions stored on a computer readable medium (e.g., memory 204) and executed by a processing device (e.g., processor 202), or a combination thereof that is configured to receive and/or transmit data from/to another device, such as, for example, a second circuitry 200 and/or the like. In some embodiments, communications module 206 (like other components discussed herein) can be at least partially embodied as or otherwise controlled by processor 202. In this regard, communications module 206 may be in communication with processor 202, such as via a bus. Communications module 206 may include, for example, an antenna, a transmitter, a receiver, a transceiver, network interface card and/or supporting hardware and/or firmware/ software for enabling communications. Communications module 206 may be configured to receive and/or transmit any data that may be stored by memory 204 using any protocol that may be used for communications. Communications module 206 may additionally and/or alternatively be in communication with the memory 204, input/output module 208 and/or any other component of circuitry 200, such as via a bus. Communications module 206 may be configured to use one or more communications protocols such as, for example, short messaging service (SMS), Wi-Fi (e.g., a 802.11 protocol, Bluetooth, etc.), radio frequency systems (e.g., 900 MHz, 1.4 GHz, and 5.6 GHz communication systems), infrared, GSM, GSM plus EDGE, CDMA, quad-band, and other cellular protocols, VOIP, or any other suitable protocol Input/output module 208 may be in communication with processor 202 to receive an indication of an input and/or to provide an audible, visual, mechanical, or other output. In that sense, input/output module 208 may include means for performing analog-to-digital and/or digital-to-analog data conversions. Input/output module 208 may include support, for example, for a display, touch screen, keyboard, button, click wheel, mouse, joystick, an image capturing device, microphone, speaker, biometric scanner, and/or other input/ output mechanisms. In embodiments where circuitry 200 may be implemented as a server or database, aspects of input/output module 208 may be reduced as compared to embodiments where circuitry 200 may be implemented as an end-user machine or other type of device designed for complex user interactions. In some embodiments (like other components discussed herein), input/output module 208 may even be eliminated from circuitry 200. Alternatively, such as in embodiments wherein circuitry 200 is embodied as a server or database, at least some aspects of input/output module 208 may be embodied on an apparatus used by a user that is in communication with circuitry 200. Input/ output module 208 may be in communication with memory 204, communications module 206, and/or any other component(s), such as via a bus. Although more than one input/output module and/or other component can be included in circuitry 200, only one is shown in FIG. 2 to avoid overcomplicating the disclosure (e.g., like the other components discussed herein).

In some embodiments, diversified promotion module 210 may also or instead be included and configured to perform the functionality discussed herein related to providing diversified promotions to consumers. In some embodiments, some or all of the functionality of diversified promotion module 210 may be performed by processor 202. In this regard, the example processes discussed herein can be performed by at least one processor 202 and/or promotion search module 210. For example, non-transitory computer readable storage media can be configured to store firmware, one or more application programs, and/or other software, which include instructions and other computer-readable program code portions that can be executed to control processors of the components of system 200 to implement various operations, including the examples shown herein. As such, a series of computer-readable program code portions may be embodied in one or more computer program products and can be used, with a device, server, database, and/or other programmable apparatus, to produce the machine-implemented processes discussed herein.

Any such computer program instructions and/or other type of code may be loaded onto a computer, processor or other programmable apparatus's circuitry to produce a machine, such that the computer, processor other programmable circuitry that executes the code may be the means for implementing various functions, including those described herein. In some embodiments, one or more external systems (such as a remote cloud computing and/or data storage system) may also be leveraged to provide at least some of the functionality discussed herein.

As described above and as will be appreciated based on this disclosure, various embodiments may be implemented as methods, mediums, devices, servers, databases, systems, and the like. Accordingly, embodiments may comprise various means including entirely of hardware or any combination of software and hardware. Furthermore, embodiments may take the form of a computer program product on at least one non-transitory computer readable storage medium having computer readable program instructions (e.g., computer software) embodied in the storage medium. Any suitable computer-readable storage medium may be utilized including non-transitory hard disks, CD/DVD-ROMs, flash memory, optical storage devices, quantum storage devices, chemical storage devices, biological storage devices, magnetic storage devices, etc.

Embodiments have been described above with reference to block diagrams of components, such as functional modules, system components and circuitry. Below is a discussion of an example process flowcharts describing functionality that may be implemented by one or more components discussed above and/or other suitably configured circuitry. Each block of the block diagrams and process flowcharts, and combinations of blocks diagrams and process flowcharts, respectively, can be implemented by various means including computer program instructions. These computer program instructions may be loaded onto a general purpose computer, special purpose computer, or other programmable data processing apparatus, such as processor 202, to produce a machine, such that the computer program product includes the instructions which execute on the computer or other programmable data processing apparatus to create a means for implementing the functions specified in the flowchart block or block diagrams.

These computer program instructions may also be stored in a computer-readable storage device (e.g., memory 204)

that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the block diagrams and process flowcharts, and combinations of blocks in the block diagrams and process flowcharts, can be implemented by special purpose hardware-based computer systems that perform the specified functions or steps, or combinations of special purpose hardware and computer instructions.

Providing Impressions with Diverse Promotions

FIG. 3 shows an example of a method 300 for providing an impression including diversified promotions, performed in accordance with some embodiments. In particular, method 300 may be performed to provide intra-impression diversity for the promotions of an impression. Method 300 is described as being performed by system 102 (e.g., server 110), however, other suitably configured structures (e.g., one or more servers, a networked device, hardware, software, firmware, circuitry, etc.) may also be used in various embodiments.

Method 300 may begin at 302 and proceed to 304, where server 110 may be configured to provide promotion data indicating promotions that are available and one or more diversity characteristics for each promotion. For example, server 110 may be configured to provide the promotion data by accessing the promotion data (e.g., from a non-transitory computer readable medium) and/or generating the promotion data. For example, in some embodiments, server 110 may be configured to access the promotion data by communicating with database 112, where the promotion data may be stored.

In some embodiments, the promotion data may indicate the promotions that are available in a promotion bank that may include active or otherwise available promotions, as well as unavailable promotions such as pending promotions, unredeemable (e.g., redemption period lapsed) promotions, discontinued promotions, or the like. In some embodiments, each promotion may be associated with an availability period. Server 110 may be configured to determine whether a promotion is an available promotion based on determining whether the availability period has lapsed. If the availability period has not lapsed, the promotion may be determined to be available, such as for offer to a consumer via an impression.

The one or more diversity characteristics for each promotion may indicate, respectively, one or more criteria by which diversity may be determined. Some example diversity characteristics of promotions may include merchant, promotion category, price, and/or location. For example, the merchant diversity characteristic of a promotion may have a value that indicates the merchant that is offering or otherwise associated with the promotion. The promotion category diversity characteristic may have a value that indicates the type of goods, services and/or experiences defined by the promotion. Some example promotion category diversity characteristic values may include "Food and Drink," "Events and Activities, "Shopping," "Beauty and Spa," etc. In some embodiments, more narrow and/or broad promotion category diversity characteristics may be used. For example, "Food and Drink" could be separated into even narrower diversity characteristics such as "Asian Food," (or even narrower, "Chinese Food," Japanese Food," etc.), "Mexican Food," "bars," "nightclubs," "restaurants," etc. While the merchant and category diversity characteristics are discussed in detail in connection with method 300, techniques similar and/or the same to those discussed herein may be readily applied to other diversity characteristics and/or combinations thereof by a person of skill having the benefit of the disclosure herein.

In some embodiments, the promotion data may further indicate a feature period for each promotion. The feature period associated with each promotion may indicate a period of time in which a promotion is featured, fresh, new, or otherwise prioritized over other promotions, such as promotions outside of their feature period. For example, promotion data indicating a promotion that has been recently provided by a merchant device or otherwise added to the promotion bank may be featured by determining a feature period set to lapse at a future time.

At 306, server 110 may be configured to generate an impression for a consumer account indicating a plurality of promotions based on the promotion data. For example, the impression may be a communication, a display, or other perceived indication, such as a flyer, print media, webpage, e-mail, text message, application alert, mobile applications, other type of electronic interface or distribution channel and/or the like, of the plurality of promotions. In some embodiments, the plurality of promotions of the impression may include promotions that are each in the associated feature for each respective promotion.

FIG. 4 shows an example impression 400, in accordance with some embodiments. In some embodiments, server 110 may be configured to provide impression 400 to a consumer device associated with the consumer account and/or consumer, such as in connection with a user interface configured to allow the consumer to interact with server 110 (e.g., to browse and/or purchase one or more promotions, among other things). Impression 400 may include indications of promotions 402, 404, 406 and 408 and associated data. For example, promotion 402 may include an image relevant to the promotion, a promotion name, a merchant indicator, a promotion price, and a description. In some embodiments, one or more of the promotions of an impression may be featured more prominently than others (e.g., as determined by feature period, relevance to the consumer, etc.), such as promotion 402 which is shown as being displayed over a larger portion of the visual "real estate" of impression 400 than the other promotions and at the top of impression 400.

In some embodiments, an impression may be associated with a promotion count indicating a number of promotions that the impression is configured to indicate or otherwise include. For example, impression 400 may be associated with a promotion count of 4 when impression 400 is configured to include four promotions, such as promotions 402, 404, 406 and 408 shown FIG. 4.

Returning to FIG. 3, in some embodiments, server 110 may be configured to determine the plurality of promotions of the impression based on whether the promotions are associated with a respective feature period that has failed to lapse. In some embodiments, server 110 may be further configured to rank promotions by featured period and/or otherwise determine the plurality of promotions of the impression based on factors such as longest feature period (e.g., remaining until lapse), shortest feature period, time of addition to the promotion bank (e.g., as may be defined by the promotion data stored in database 112), relevance to the consumer's interests or purchasing history, and/or the like. For example, the plurality of promotions of the impression may be determined to indicate a plurality of (e.g., as determined by the promotion count) the highest ranking promotions under one or more (e.g., weighted) criteria of the ranking criteria discussed herein.

At 308, server 110 may be configured to determine, based on the promotion data, whether the first diversity characteristic of a first promotion (e.g., of the plurality of promotions of the impression) shares the same value as the first diversity characteristic of a second promotion (e.g., of the plurality of promotions of the impression). In some embodiments, server 110 may be further configured to determine whether any of the plurality of promotions share a common first diversity characteristic value.

For example, where the diversity characteristic includes a merchant, server 110 may be configured to determine whether the first promotion and the second promotion are associated with the same merchant. In another example, where the diversity characteristic includes a promotion category, server 110 may be configured to determine whether the first promotion and the second promotion are associated with the same promotion category. Additionally, in some embodiments, server 110 may be further configured to determine whether the first promotion includes a related first diversity characteristic with the second promotion. For example, two or more promotion category values may be associated or otherwise determined to be related based having a similar and/or related diversity characteristic value, such as two merchants in the same economic market and/or two promotion categories directed to substitute and/or complementary goods, services, and/or experiences.

In some embodiments, server 110 may be configured to tolerate an impression having only a small number of non-diverse promotions. For example, server 110 may be configured to determine whether three or more promotions share diversity characteristic value, and in response to determining that three or more promotions share the same diversity characteristic value, server 110 may be further configured to replace at least one of the three or more promotions with a different promotion having a different diversity characteristic. In various embodiments, the threshold for determining diversity and taking corrective action may vary. For example, server 110 may be configured to ensure complete intra-impression diversity for the merchant diversity characteristic while tolerating some redundancy for the promotion category diversity characteristic. In another example, server 110 may be configured to ensure complete intra-impression diversity for the promotion category diversity characteristic while tolerating some redundancy for the merchant diversity characteristic.

In response to determining that the first diversity characteristic of the first promotion has the same (and/or a related) value as the first diversity characteristic of the second promotion, method 300 may proceed to 310, where server 110 may be configured to update the impression by replacing the first promotion (e.g., or the second promotion) with a third promotion associated with a different value for the first diversity characteristic than the first promotion.

For example, where first diversity characteristic includes the merchant, server 110 may be configured to replace the first promotion with the third promotion associated with a different merchant than the first promotion, thereby creating diversity in the impression between the second promotion (e.g., kept in the impression) and the third promotion (e.g., being added to replace the first promotion).

In some embodiments, server 110 may be configured to select the third (e.g., replacement) promotion based on feature period of promotions, such as promotions in the promotion bank as defined by the promotion data. For example, the third promotion may be determined to be associated (e.g., based on the promotion data stored in database 112) with a feature period that has not lapsed before being added to the impression and promotions associated with lapsed feature periods may be excluded from consideration.

In some embodiments, server 110 may be additionally or alternatively configured to select the third promotion based on the availability period of promotions, such as the promotions in the promotion bank. For example, the third promotion may be determined to be associated (e.g., based on the promotion data stored in database 112) with an availability period that has not lapsed before being added to the impression and promotions associated with lapsed availability periods or otherwise unavailable for offering may be excluded from consideration.

In some embodiments, server 110 may additionally or alternatively be configured to select the third promotion based on the promotion data (e.g., defining the parameters of the promotion) and using historical data indicating the interests and/or purchase history of the consumer. In that sense, replacement promotions may in some embodiments provide for targeted offers that have a particular relevance to a particular consumer.

In some embodiments, the determination of diversity between the first and second promotions and/or the replacement of the first promotion with the third promotion may occur during the generation of the impression at 306. In another example, the impression may be first generated to include the number of promotions as specified by the promotion count (e.g., based on the promotions being in their feature period and without considering diversity) with promotion replacement based on diversity considerations being performed in a subsequent step. Here, promotions in their feature period may be given higher priority while simultaneously ensuring that the impression includes diverse promotions.

At 312, server 110 may be configured to provide the impression to a consumer device associated with the consumer account. For example, the consumer device may be associated with the consumer and/or consumer account, such as based on the consumer device sending login data associated with a consumer account to server 110 or like. As discussed above, server 110 may be configured to provide the impression using any suitable communication channel e-mail, text message (e.g., short messaging service (SMS)), webpage, application alert, mobile application, other type of electronic interface or distribution channel and/or the like.

Returning to 308, in response to determining that the first promotion and the second promotion fail to share the at least one diversity characteristic, method 300 may proceed to 312, where server 110 may be configured to provide the impression to a consumer device associated with the consumer account. Method 300 may then proceed to 314 and end.

FIG. 5 shows an example of a method 500 for providing an impression including diversified promotions, performed in accordance with some embodiments. In particular, method 500 may be performed to provide inter-impression diversity for the promotions of an impression, such as based on tracking previously sent impressions and the promotions indicated therein and/or the associated diversity characteristics of the promotions. Method 500 is described as being performed by system 102 (e.g., server 110), however, other suitably configured structures (e.g., one or more servers, a networked device, hardware, software, firmware, circuitry, etc.) may also be used in various embodiments. In some embodiments, method 500 may be performed in connection with method 300, such as to ensure both intra-impression and inter-impression diversity.

Method 500 may begin at 502 and proceed to 504, where server 110 may be configured to access, from a non-transitory computer readable medium, historical consumer data indicating one or more diversity characteristic values associated with promotions that have been provided to the consumer account within a predetermined time. For example, in some embodiments, server 110 may be configured to access the historical consumer data by communicating with database 112, where the historical consumer data may be stored.

In some embodiments, server 110 may be further configured to generate the historical consumer data. For example, after providing the impression to the consumer device at 312 of method 300, server 110 may be further configured to generate historical consumer data associating the consumer and/or consumer account with the promotions indicated by the impression. Server 110 may be further configured to track promotions and/or associated diversity characteristics for each communication sent to the consumer and/or consumer account (e.g., such as via multiple impressions over a predetermined period of time) and update the historical consumer data accordingly.

At 506, server 110 may be configured to determine whether a first promotion of the plurality of promotions of an impression (e.g., as generated at 306 of method 300) includes a diversity characteristic that has the same value as at least one of the one or more with the one or more diversity characteristics associated with promotions that have been provided to the consumer account within the predetermined time. In some embodiments, server 110 may be further configured to determine whether each promotion of the plurality of promotions of the impression includes a matching diversity characteristic with the one or more diversity characteristics associated with promotions that have been provided to the consumer account within the predetermined time. Here, for example, one or more of the promotions of the impression may be replaced to achieve greater inter-impression diversity in view of the historical consumer data.

In some embodiments, the predetermined time may define a time in which a promotion having a diversity characteristic in common with another promotion that has been previously sent (e.g., via an impression) to the same consumer may be determined to lack diversity and corrective action may be taken, such as by updating, modifying or otherwise generating the impression as discussed herein. For example, in some embodiments, the predetermined time may be defined as a week such that the promotions provided to the consumer device on each day of the week do not share any diversity characteristics, or alternatively, do not share one or more particular diversity characteristics of interest. In various embodiments, the diversity characteristic may include the merchant diversity characteristic, the promotion category diversity characteristic, and/or any other suitable diversity characteristic based on which promotion diversity may be determined.

In some embodiments, server 110 may be configured to tolerate varying amounts of non-diverse inter-impression promotions. For example, server 110 may be configured to determine whether the diversity characteristic of the first promotion has the same value as at least two of the diversity characteristics associated with promotions that have been provided within the predetermined time, and if so, server 110 may be further configured to replace the first promotion. Here, two promotions within the predetermined time may be allowed to share a common diversity characteristic. In other examples, more than two (e.g., three, four, etc.) promotions within the predetermined time may be allowed to share the common diversity characteristic. In some embodiments, different diversity characteristics (e.g., merchant, promotion category, etc.) may have different amounts of inter-impression tolerance for non-diversity.

In response to determining that the first promotion of the impression includes a diversity characteristic that has the same value as at least one of the one or more diversity characteristics (e.g., associated with the promotions that have been provided to the consumer account within the predetermined time), method 500 may proceed to 508, where server 110 may be configured to update the impression by replacing the first promotion with a second promotion associated a different value for the diversity characteristic than the one or more diversity characteristics and/or the diversity characteristic of the first promotion. In some embodiments, some of the discussion at 310 of method 300 may be applicable at 508. For example, the second promotion may be determined from other available promotions based on feature periods, historical data and/or preferences of consumers, and/or various ranking criteria discussed above.

At 510, server 110 may be configured to provide the impression to a consumer device associated with the consumer account. The discussion at 312 of method 300 may be applicable at 510, and is not repeated to avoid unnecessarily overcomplicating the disclosure.

Returning to 506, in response to determining that the first promotion of the impression fails to include a diversity characteristic that has the same value as at least one of the one or more diversity characteristics associated with the promotions that have been provided to the consumer account within the predetermined time, method 500 may proceed to 510, where server 110 may be configured to provide the impression to a consumer device associated with the consumer account. Method 500 may then proceed to 512 and end.

FIG. 6 shows an example of a method 600 for providing promotion inventory shock management, performed in accordance with some embodiments. In particular, method 600 may be performed to add one or more available promotions to an impression when the promotion data indicates an insufficient number of promotions in their feature period to satisfy the promotion count of the impression. Method 600 is described as being performed by system 102 (e.g., server 110), however, other suitably configured structures (e.g., one or more servers, a networked device, hardware, software, firmware, circuitry, etc.) may also be used in various embodiments. In some embodiments, method 600 may be performed in connection with methods 300 and/or 500.

Method 600 may begin at 602 and proceed to 604, where server 110 may be configured to generate promotion data indicating promotions that are available, an associated feature period for each promotion, and one or more diversity characteristics for each promotion. For example, server 110 may be configured to receive the promotion data from merchant devices 108, via user input, and/or from some other networked device. In some embodiments, the promotion data may define a promotion bank that includes at least each promotion that is available for offer, and in various embodiments, also promotions unavailable promotions (e.g., discontinued, expired, etc.). Here, server 110 may be configured to modify, update, or otherwise generate an impression based on the promotions and associated promotion data stored in the promotion bank (e.g., in database 112). Furthermore, in some embodiments, the promotion data discussed above in connection with methods 300 and 500 may be accessed from the promotion bank.

At 606, server 110 may be configured to generate an impression for a consumer account indicating a plurality of promotions that are each in their feature period based on promotion data. The discussion at 306 of method 300 may be applicable at 606 and is not repeated to avoid unnecessarily overcomplicating the disclosure. In some embodiments, server 110 may be further configured to determine the plurality of promotions as targeted promotions for the consumer, such as based on one or more relevance rules. For example, promotions that are redeemable beyond a certain distance from the consumer and/or consumer device location may be filtered out from the promotion bank of potential candidates. In another example, historical data indicating consumer activity, preferences, purchase history, or the like may be used to ensure that one or more of the plurality of promotions of the impression are relevant to the consumer.

At 608, server 110 may be configured to determine a promotion count for the impression indicating a number of promotions that the impression is configured to indicate. The discussion at 306 of method 300 may also be applicable at 608. With reference to FIG. 4, for example, impression 400 may be associated with a promotion count of 4 when impression 400 is configured to include four promotions, such as promotions 402, 404, 406 and 408 shown FIG. 4.

At 610, server 110 may be configured to determine whether plurality of promotions of the impression is less than the promotion count. As discussed above at 606, the plurality of the promotions of the impression may include promotions that are each in their feature period and/or satisfy various relevance rules. In that sense, depending on fluctuations in inventory for promotions in their feature period (and/or promotions satisfying one or more relevance rules), the plurality of promotions of the impression may be determined to be less the promotion count for the impression. For example, where only 3 promotions within a predetermined distance to the consumer are in their feature period and the impression count is 4, server 110 may be configured to determine that the plurality of promotions of the impression is less than the promotion count.

In response to determining that the plurality of promotions of the impression is less than the promotion count, method 600 may proceed to 612, where server 110 may be configured to update the impression by adding a promotion to the impression. In some embodiments, the promotion being added may include a lapsed feature period and/or an availability period that has failed to lapse. Similarly, one or more relevance rules may be applied in selecting the promotion, such as from the promotion pool including many available promotion candidates.

In some embodiments, server 110 may be configured to ensure intra-impression diversity and/or inter-impression for the impression. For example, such as where intra-impression diversity is leveraged, server 110 may be configured to update the impression by adding the promotion such that the promotion is associated with a different first diversity characteristic value than the first diversity characteristic values of each of the plurality of promotions (e.g., as added to the impression at 606). In some embodiments, the promotion being added may be associated with different one or more diversity characteristic values in comparison with the corresponding one or more diversity characteristics of each of the plurality of promotions. In another example, such as where inter-impression diversity is leveraged, server 110 may be configured to update the impression by adding the promotion such that the promotion is associated with a different first diversity characteristic value than first diversity characteristic values associated with promotions that have been provided to the consumer account within a predetermined period of time. In that sense, the discussions above regarding promotion diversity in connection with methods 300 and 500 may be applicable to method 600.

At 614, server 110 may be configured to provide the impression to a consumer device associated with a consumer account. The discussion at 312 of method 300 may be applicable at 614, and is not repeated to avoid unnecessarily overcomplicating the disclosure.

Returning to 610, in response to determining that the plurality of promotions of the impression fails to be less than the promotion count, method 600 may proceed to 614, where server 110 may be configured to provide the impression to a consumer device associated with a consumer account. Method 600 may then proceed to 616 and end.

Promotion Performance Test

Some embodiments may provide for techniques for testing the performance of a promotion with consumers. For example, a promotion may be associated with a prefeature period that begins and ends prior to the beginning of the feature period of the promotion. While the promotion is in its prefeature period, the promotion may be a test promotion included in one or more impressions sent to consumer devices associated with a (e.g., random) sampling of consumers and/or accounts. Based on purchases of the test promotion by the consumers and the consumer demographics of purchasers, various conversion rates for the test promotion may be determined for various consumer demographics. These conversion rates may then be used to provide targeted promotions of particular relevance to other consumers, such as based on the consumer demographics of the other consumers.

FIG. 7 shows an example of a method 700 for providing a promotion performance test, performed in accordance with some embodiments. Method 700 is described as being performed by system 102 (e.g., server 110), however, other suitably configured structures (e.g., one or more servers, a networked device, hardware, software, firmware, circuitry, etc.) may also be used in various embodiments.

Method 700 may being at 702 and proceed to 704, where server 110 may be configured to access, from a computer readable medium, promotion data indicating test promotions that are available and an associated prefeature period for each test promotion. For example, in some embodiments, the test promotions may be stored in the promotion bank with other available promotions, such as in database 112.

At 706, server 110 may be configured to generate an impression for a consumer account indicating a test promotion that is in its feature period based on the promotion data. For example, the impression may include a plurality of promotions including one or more test promotions. Non-test promotions, when included in the impression, may be in their feature period and/or may be associated with a lapsed feature period. In that sense, method 700 may be performed in connection with methods 300, 500 and/or 600.

At 708, server 110 may be configured to provide the impression to consumer devices associated with a random sampling of consumer accounts. For example, server 110 may be configured to provide the impression to 4,000 randomly selected consumers of the consumers associated with the system (e.g., such as via consumer accounts).

At 710, server 110 may be configured to receive promotion purchase data from one or more consumer devices indicating purchases of the test promotion. The one or more consumer devices, for example, may be a subset of the consumer devices that received the impression at 708.

At 712, server 110 may be configured to determine a consumer demographic for consumers associated with the one or more consumer devices. Some example consumer demographics may include distance from merchant (e.g., within 5 miles, 10 miles, etc.), gender, age, purchase history, consumer preferences, or the like. For example, where distance from the merchant is used, server 110 may be configured to determine that the promotion purchase data received from the one or more consumer devices may be associated with consumers that within a particular distance range from the merchant (e.g., within 5 miles). In another example, where gender is used, server 110 may be configured to determine that the promotion purchase data received from the one or more consumer devices may be associated with consumers of a certain age or age range.

At 714, server 110 may be configured to determine a conversion rate for the test promotion for the consumer demographic based on a number of impressions including the test promotion provided to consumers of the consumer demographic and a number of purchases of the test promotion by consumers of the consumer demographic. For example, where distance from the merchant within 5 miles is the consumer demographic of interest, server 110 may be configured to determine a conversion rate for the test promotion based on a number of impressions including the test promotion provided to consumers within 5 miles of the merchant and a number of purchases of the test promotion by consumers within 5 miles of the merchant.

In some embodiments, server 110 may be configured to determine each consumer demographic of interest and determine conversion rates for the test promotion for each consumer demographic of interest. In that sense, server 110 may be configured to determine a plurality of conversion rates for the test promotion with each conversion rate being associated with different one or more (e.g., weighted) consumer demographics.

In some embodiments, after determining a conversion rate for a consumer demographic for a test promotion, server 110 may be configured provide the test promotion as a non-test promotion. For example, the promotion may be offered to consumers as part of one or more impressions using the techniques discussed herein. In some embodiments, targeted promotions having a particular relevance to a consumer (e.g., based on the consumer demographics of the consumer and the conversion rate for the consumer demographic) may be sent to consumer devices associated with the consumer in favor of promotions having a lesser relevance to the consumer. In that sense, some embodiments may provide for techniques for programmatically providing diverse and targeted promotions. Method 700 may then proceed to 716 and end.

CONCLUSION

Many modifications and other embodiments will come to mind to one skilled in the art to which these embodiments pertain having the benefit of the teachings presented in the foregoing descriptions and the associated drawings. For example, the techniques discussed herein involving providing diversified promotions can be easily be extended to other contexts where diversified goods, services, and/or experiences may be offered to consumers. Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

That which is claimed:

1. A system configured to provide impressions including programmatically diversified promotions to consumer devices, comprising:
   a promotion database; and
   one or more servers including
   communication circuitry configured to form a connection with the consumer devices via a network; and
   processing circuitry configured to:
   access promotion data from the promotion database indicating available promotion data records and one or more diversity characteristics for each available promotion data record;
   generate an impression, configured for rendering on a display of a consumer device, targeted to a consumer account associated with the consumer device, wherein the impression comprises a plurality of promotion display indications respectively associated with a plurality of promotion data records, wherein the plurality of promotion display indications are configured for rendering simultaneously on the display of the consumer device, wherein sizes of images associated with one or more promotion display indications of the plurality of promotion display indications are increased, based on at least one of feature period and relevance, so as to occupy a more prominent visual area on the display of the consumer device, and wherein the plurality of promotion data records are selected from the available promotion data records based at least in part on a relevance ranking of the available promotion data records with respect to the consumer account;
   determine, based on the accessed promotion data, whether a first diversity characteristic of a first promotion data record has the same value as a second diversity characteristic of a second promotion data record, wherein the first promotion data record and the second promotion data record are part of the plurality of promotion data records;
   update the plurality of promotion display indications of the impression to replace a first promotion display indication associated with the first promotion data record with a third promotion display indication associated with a third promotion data record in response to determining that the first diversity characteristic of the first promotion data record has the same value as the second diversity characteristic of the second promotion data record wherein the third promotion data record is associated with a third diversity characteristic having a different value than the first diversity characteristic of the first promotion data record, wherein the third promotion data record is selected from a relevant promotion set that satisfies a relevance threshold for a consumer demographic of the consumer account, and wherein the relevant promotion set is determined by:
accessing, from the promotion database, promotion data indicating test promotions that are each associated with a prefeature period,
generating a test impression for a test consumer account indicating a test promotion that is in its feature period based on the promotion data associated with the test promotion,
providing the test impression to one or more test consumer devices determined based on a sampling of consumer accounts,
receiving promotion purchase data from the one or more test consumer devices indicating purchases of the test promotion,
determining a set of consumer demographics for consumers associated with the one or more test consumer devices,
determining a conversion rate for the test promotion for a consumer demographic similar to the consumer demographic of the consumer account based on the promotion purchase data,
in circumstances where the conversion rate satisfies a pre-defined threshold, flagging the test promotion and a set of promotions associated with the test promotion as satisfying a relevance threshold relative to the consumer account, and
flagging the set of promotions associated with the test promotion as the relevant promotion set; and
provide the impression to the consumer device associated with the consumer account for rendering on the display of the consumer device via the network.

2. The system of claim 1 further comprising a consumer database, wherein the processing circuitry is further configured to:
access, from the consumer database, historical consumer data indicating one or more historical diversity characteristic values associated with promotion data records that have been provided to the consumer account within a predetermined time;
determine whether the first diversity characteristic of the first promotion data record of the plurality of promotion data records has the same value as at least one of the one or more historical diversity characteristic values; and
in response to determining that the first diversity characteristic of the first promotion data record has the same value as the at least one of the one or more historical diversity characteristic values, update the plurality of promotion display indications of the impression by replacing the first promotion display indication associated with the first promotion data record with a fourth promotion display indication associated with a fourth promotion data record associated with a fourth diversity characteristic that is different from the first diversity characteristic.

3. The system of claim 1, wherein the first diversity characteristic includes one of a promotion category and a merchant.

4. The system of claim 1, wherein the processing circuitry is further configured to:
determine an availability period for the third promotion data record based on the promotion data;
determine whether the availability period has lapsed; and
in response to determining that the availability period has failed to lapse, update the plurality of promotion display indications of the impression by replacing the first promotion display indication associated with the first promotion data record with the third promotion display indication associated with the third promotion data record.

5. The system of claim 1, wherein the processing circuitry is further configured to:
determine a promotion count for the impression indicating a number of promotion display indications associated with promotion data records that the impression is configured to display;
determine whether the plurality of promotion display indications of the impression is less than the promotion count; and
in response to determining that the plurality of promotion display indications is less than the promotion count, update the impression by adding an additional promotion display indication associated with an additional promotion data record.

6. The system of claim 5, wherein the additional promotion data record is associated with a different diversity characteristic value than the first diversity characteristic, the second diversity characteristic, and the third diversity characteristic.

7. The system of claim 5, wherein:
the additional promotion data record is associated with a different diversity characteristic value than a diversity characteristic values set associated with a promotion data records set that has been provided to the consumer device within a predetermined period of time; and
the processing circuitry is further configured to:
track promotion data records provided to the consumer device;
generate historical consumer data indicating the promotion data records provided to the consumer device; and
store the historical consumer data in a consumer database.

8. The system of claim 1, wherein the processing circuitry comprises a promotion search module, and wherein the promotion search module is configured to perform at least:
determining that the first diversity characteristic of the first promotion data record has the same value as the second diversity characteristic of the second promotion data record, updating the plurality of promotion display indications of the impression by replacing the first promotion display indication associated with the first promotion data record with the third promotion display indication associated with the third promotion data record, and determining the relevant promotion set.

9. A machine-implemented method for providing impressions including programmatically diversified promotions to consumer devices, comprising:
accessing, by circuitry connected with the consumer devices via a network, promotion data from a promotion database indicating available promotion data records and one or more diversity characteristics for each available promotion data record;

generating, by the circuitry, an impression, configured for rendering on a display of a consumer device, targeted to a consumer account associated with the consumer device, wherein the impression comprises a plurality of promotion display indications respectively associated with a plurality of promotion data records for rendering simultaneously on the display of the consumer device, wherein sizes of images associated with one or more promotion display indications of the plurality of promotion display indications are increased, based on at least one of feature period and relevance, so as to occupy a more prominent visual area on the display of the consumer device, and wherein the plurality of promotion data records are selected from the available promotion data records based at least in part on a relevance ranking of the available promotion data records with respect to the consumer account;

determining, based on the promotion data and by the circuitry, whether a first diversity characteristic of a first promotion data record has the same value as a second diversity characteristic of a second promotion data record, wherein the first promotion data record and the second promotion data record are part of the plurality of promotion data records;

updating the plurality of promotion display indications of the impression to replace a first promotion display indication associated with the first promotion data record with a third promotion display indication associated with a third promotion data record in response to determining that the first diversity characteristic of the first promotion data record has the same value as the second diversity characteristic of the second promotion data record, wherein the third promotion data record is associated with a third diversity characteristic having a different value than the first diversity characteristic of the first promotion data record, wherein the third promotion data record is selected from a relevant promotion set that satisfies a relevance threshold for a consumer demographic of the consumer account, and wherein the relevant promotion set is determined by:

accessing, from the promotion database, promotion data indicating test promotions that are each associated with a prefeature period, generating a test impression for a test consumer account indicating a test promotion that is in its feature period based on the promotion data associated with the test promotion, providing the test impression to one or more test consumer devices determined based on a sampling of consumer accounts, receiving promotion purchase data from the one or more test consumer devices indicating purchases of the test promotion, determining a consumer demographic for consumers associated with the one or more test consumer devices, determining whether the consumer demographic for consumers associated with the one or more test consumer devices is similar to the consumer demographic of the consumer account, in circumstances where the consumer demographic for consumers associated with the one or more test consumer devices is similar to the consumer demographic of the consumer account, determining a conversion rate for the test promotion for the consumer demographic based on the promotion purchase data, in circumstances where the conversion rate satisfies a pre-defined threshold, flagging the test promotion and a set of promotions associated with the test promotion as satisfying a relevance threshold relative to the consumer account, and flagging the set of promotions associated with the test promotion as the relevant promotion set; and providing, by the circuitry, the impression to the consumer device associated with the consumer account for rendering on the display of the consumer device via the network.

10. The method of claim 9 further comprising, by the circuitry:

accessing, from a consumer database, historical consumer data indicating one or more historical diversity characteristic values associated with promotion data records that have been provided to the consumer account within a predetermined time;

determining whether the first diversity characteristic of the first promotion data record of the plurality of promotion data records has the same value as at least one of the one or more historical diversity characteristic values; and in response to determining that the first diversity characteristic of the first promotion data record has the same value as the at least one of the one or more historical diversity characteristic values, updating the plurality of promotion display indications of the impression by replacing the first promotion display indication of the first promotion data record with a fourth promotion display indication of a fourth diversity characteristic that is different from the first diversity characteristic.

11. The method of claim 9, wherein the first diversity characteristic includes one of a promotion category and a merchant.

12. The method of claim 9 further comprising, by the circuitry:

determining an availability period for the third promotion data record based on the promotion data;

determining whether the availability period has lapsed; and in response to determining that the availability period has failed to lapse; updating the plurality of promotion display indications of the impression by replacing the first promotion display indication associated with the first promotion data record with the third promotion display indication associated with the third promotion data record.

13. The method of claim 9 further comprising, by the circuitry:

determining a promotion count for the impression indicating a number of promotion display indications associated with promotion data records that the impression is configured to display;

determining whether the plurality of promotion display indications of the impression is less than the promotion count; and in response to determining that the plurality of promotion display indications is less than the promotion count, updating the impression by adding an additional promotion display indication associated with an additional promotion data record.

14. The method of claim 13, wherein the additional promotion data record is associated with a different diversity characteristic value than the first diversity characteristic, the second diversity characteristic, and the third diversity characteristic.

15. The method of claim 13, wherein the additional promotion data record is associated with a different diversity characteristic value than a diversity characteristic values set associated with a promotion data records set that has been provided to the consumer device within a predetermined period of time.

16. The method of claim 9, wherein the circuitry comprises a promotion search module, and wherein the promotion search module is configured to perform at least: determining that the first diversity characteristic of the first promotion data record has the same value as the second diversity characteristic of the second promotion data record, updating the plurality of promotion display indications of the impression by replacing the first promotion display indication associated with the first promotion data record with the third promotion display indication associated with the third promotion data record, and determining the relevant promotion set.

17. An apparatus configured to provide impressions including programmatically diversified promotions to consumer devices, comprising:
 networked processing circuitry connected with the consumer devices and configured to:
 access promotion data from a promotion database indicating available promotion data records and one or more diversity characteristics for each available promotion data record;
 generate an impression, configured for rendering on a display of a consumer device, targeted to a consumer account associated with the consumer device, wherein the impression comprises a plurality of promotion display indications respectively associated with a plurality of promotion data records, wherein the plurality of promotion display indications are configured for rendering simultaneously on the display of the consumer device, wherein sizes of images associated with one or more promotion display indications of the plurality of promotion display indications are increased, based on at least one of feature period and relevance, so as to occupy a more prominent visual area on the display of the consumer device, and wherein the plurality of promotion data records are selected from the available promotion data records based at least in part on a relevance ranking of the available promotion data records with respect to the consumer account;
 determine, based on the accessed promotion data, whether a first diversity characteristic of a first promotion data record has the same value as a second diversity characteristic of a second promotion data record, wherein the first promotion data record and the second promotion data record are part of the plurality of promotion data records;
 update the plurality of promotion display indications of the impression to replace a first promotion display indication associated with the first promotion data record with a third promotion display indication associated with a third promotion data record in response to determining that the first diversity characteristic of the first promotion data record has the same value as the second diversity characteristic of the second promotion data record, wherein the third promotion data record is associated with a third diversity characteristic having a different value than the first diversity characteristic of the first promotion data record, wherein the third promotion data record is selected from a relevant promotion set that satisfies a relevance threshold for a consumer demographic of the consumer account, and wherein the relevant promotion set is determined by:
 accessing, from the promotion database, promotion data indicating test promotions that are each associated with a prefeature period,
 generating a test impression for a test consumer account indicating a test promotion that is in its feature period based on the promotion data associated with the test promotion,
 providing the test impression to one or more test consumer devices determined based on a sampling of consumer accounts,
 receiving promotion purchase data from the one or more test consumer devices indicating purchases of the test promotion,
 determining a consumer demographic for consumers associated with the one or more test consumer devices,
 determining whether the consumer demographic for consumers associated with the one or more test consumer devices is similar to the consumer demographic of the consumer account,
 in circumstances where the consumer demographic for consumers associated with the one or more test consumer devices is similar to the consumer demographic of the consumer account,
 determining a conversion rate for the test promotion for the consumer demographic based on the promotion purchase data,
 in circumstances where the conversion rate satisfies a pre-defined threshold, flagging the test promotion and a set of promotions associated with the test promotion as satisfying a relevance threshold relative to the consumer account, and
 flagging the set of promotions associated with the test promotion as the relevant promotion set;
 access, from a consumer database, historical consumer data indicating one or more historical diversity characteristic values associated with promotion data records that have been provided to the consumer account within a predetermined time;
 determine whether a fourth diversity characteristic of a fourth promotion data record of the plurality of promotion data records has the same value as at least one of the one or more historical diversity characteristic values;
 in response to determining that the fourth diversity characteristic of the fourth promotion data record has the same value as the at least one of the one or more historical diversity characteristic values, update the plurality of promotion display indications of the impression by replacing a fourth promotion display indication associated with the fourth promotion data record with a fifth promotion display indication associated with a fifth promotion data record associated with a fifth diversity characteristic that is different from the fourth diversity characteristic; and
 provide the updated impression to the consumer device associated with the consumer account for simultaneous rendering of the second promotion display indication, the third promotion display indication, and the fifth promotion display indication on the display of the consumer device via the network.

18. The apparatus of claim 17, wherein the networked processing circuitry comprises a promotion search module, and wherein the promotion search module is configured to perform at least: determining that the first diversity characteristic of the first promotion data record has the same value as the second diversity characteristic of the second promotion data record, updating the plurality of promotion display indications of the impression by replacing the first promotion display indication associated with the first promotion data record with the third promotion display indication associated with the third promotion data record, and determining the relevant promotion set.

* * * * *